United States Patent
Maeda

(10) Patent No.: US 12,441,176 B2
(45) Date of Patent: Oct. 14, 2025

(54) HYBRID ELECTRIC VEHICLE

(71) Applicant: TOYOTA JIDOSHA KABUSHIKI KAISHA, Toyota (JP)

(72) Inventor: Kotaro Maeda, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 286 days.

(21) Appl. No.: 18/454,299

(22) Filed: Aug. 23, 2023

(65) Prior Publication Data
US 2024/0190237 A1   Jun. 13, 2024

(30) Foreign Application Priority Data
Dec. 9, 2022 (JP) .................................. 2022-197312

(51) Int. Cl.
*B60K 6/445* (2007.10)
*B60W 10/06* (2006.01)
*B60W 10/08* (2006.01)
*B60W 20/50* (2016.01)

(52) U.S. Cl.
CPC ............. *B60K 6/445* (2013.01); *B60W 10/06* (2013.01); *B60W 10/08* (2013.01); *B60W 20/50* (2013.01)

(58) Field of Classification Search
CPC ....... B60K 6/445; B60W 10/06; B60W 10/08; B60W 20/50
See application file for complete search history.

(56) References Cited

U.S. PATENT DOCUMENTS

2018/0178654 A1*  6/2018  Nishimura ............... B60L 50/15
2019/0111913 A1*  4/2019  Shimizu ................. B60W 50/06

FOREIGN PATENT DOCUMENTS

| JP | 2004194476 A | * | 7/2004 |
| JP | 2010-068689 A | | 3/2010 |
| JP | 2010215190 A | * | 9/2010 |
| JP | 2018-042431 A | | 3/2018 |

* cited by examiner

*Primary Examiner* — Edwin A Young
(74) *Attorney, Agent, or Firm* — SoraIP, Inc.

(57) ABSTRACT

Controls when the abnormality in which the switching element of the lower arm of the step-up converter is short-circuited occurs and connection between the storage device and the step-up converter and the third inverter is released by the disconnection device the power generated by the first motor by the power from the engine in a state of turning off the switching element of the upper arm of the step-up converter and turning off the third inverter in a state of three-phase on, the engine and the first, the second, the third inverter and the switching element on the step-up converter are controlled so that the traveling travels while consuming by the second motor, when the temperature of the third motor exceeds the allowable temperature in the case of performing the limp home mode, to stop the limp home mode.

2 Claims, 5 Drawing Sheets

HYBRID ELECTRIC VEHICLE

CROSS-REFERENCE TO RELATED APPLICATION

This application claims priority to Japanese Patent Application No. 2022-197312 filed on Dec. 9, 2022, incorporated herein by reference in its entirety.

BACKGROUND

1. Technical Field

The present disclosure relates to a hybrid electric vehicle.

2. Description of Related Art

Conventionally, as a hybrid electric vehicle of this type, there has been proposed a vehicle including an engine, a first motor (motor generator), a planetary gear (power split mechanism), a second motor (motor generator), a first and second inverters, a power storage device (battery), an auxiliary battery, a step-up converter, a capacitor, and a system main relay (see, for example, Japanese Unexamined Patent Application Publication No. 2018-42431 (JP 2018-42431 A)). The three rotating elements of the planetary gear are connected to the first motor, the engine and a drive shaft coupled to one of front wheels or rear wheels. The second motor is connected to the drive shaft. The first and second inverters drive the first and second motors. The step-up converter boosts the power from the power storage device and supplies the boosted power to the first and second inverters. The auxiliary battery is connected to a power line between the battery and the step-up converter via a direct current to direct current (DCDC) converter. The capacitor smooths the voltage of a first power line between the step-up converter and the first and second inverters. The system main relay is provided closer to the power storage device than the connecting point of the DCDC converter in the power line between the battery and the step-up converter. In this hybrid electric vehicle, the engine, the first and second inverters, the step-up converter, and the system main relay are controlled so that the system main relay is opened and the auxiliary battery is charged with the power generated by the first motor when all of the following conditions are met: the overcurrent is generated in the step-up converter, the switching element of the lower arm of the step-up converter is gated off, the capacitor is below a predetermined voltage, and the current of the storage device is equal to or more than a predetermined current. This suppresses a decrease in the amount of electricity stored in the auxiliary battery.

SUMMARY

In the above-described hybrid electric vehicle, a hybrid electric vehicle is proposed which includes: a third motor connected to the other of the front wheels and the rear wheels, a third inverter connected to a second power line between the power storage device and the step-up converter and driving the third motor, and a fuse attached to a side of the second power line closer to the power storage device than the connection point of a third inverter. In this hybrid electric vehicle, when an anomaly occurs in which the lower arm of the step-up converter is short-circuited during traveling, the second power line is short-circuited, the fuse is blown, the battery is disconnected from the step-up converter and the third inverter, and a closed circuit including the short-circuited lower arm of the step-up converter, the third inverter, and the third motor is formed. When the third motor rotates in a dragging manner in a state in which such a closed circuit is formed, a back electromotive force is generated in the second power line, and an excessive current flows in the second power line. As a method of suppressing the excessive current to the second power line, a method of forming a closed circuit including the third motor and the third inverter with three phases in the third inverter turned on is conceived. However, when the vehicle travels in a state in which the closed circuit including the third motor and the third inverter is formed, a relatively large current flows through the third motor due to the back electromotive force caused by the rotation of the third motor, and the third motor becomes high in temperature.

An object of the hybrid electric vehicle of the present disclosure is to suppress the third motor from becoming high in temperature.

In order to achieve the above-described main object, the hybrid electric vehicle of the present disclosure adopts the following measures.

A hybrid electric vehicle of the present disclosure includes: an engine; a first motor; a planetary gear in which three respective rotating elements are connected to the first motor, the engine, and a drive shaft connected to one of a front wheel and a rear wheel; a second motor connected to the drive shaft; a first inverter and a second inverter that drive the first motor and the second motor; a power storage device; a step-up converter that includes two switching elements of an upper arm and a lower arm, and reactor, boosts power from the power storage device, and supplies the boosted power to the first inverter and the second inverter; a third motor connected to another one of the front wheel and the rear wheel; a third inverter that is connected to a power line between the power storage device and the step-up converter via a connection line and drives the third motor; a disconnection device that allows the power storage device to be connected to and disconnected from the step-up converter and the third inverter; and a control device that controls the engine, the first inverter, the second inverter, the third inverter, and the two switching elements of the step-up converter. In the hybrid electric vehicle, the control device controls the engine, the first inverter, the second inverter, the third inverter, and a switching element of the upper arm of the step-up converter such that a limp home mode is executed when an abnormality in which a switching element of the lower arm of the step-up converter is short-circuited occurs and the disconnection device disconnects the power storage device from the step-up converter and the third inverter, the limp home mode being a mode in which the vehicle travels while the second motor consumes electric power generated by the first motor using power from the engine in a state in which the switching element of the upper arm of the step-up converter is turned off and three phases in the third inverter are turned on, and stops the limp home mode when a temperature of the third motor exceeds an allowable temperature in a case in which the limp home mode is executed.

In the hybrid electric vehicle of the present disclosure, the disconnection device may be a fuse attached to a side of the power line closer to the power storage device than a connection point of the connection line.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Next, modes for carrying out the disclosure will be described using an embodiment.

Figure 1:
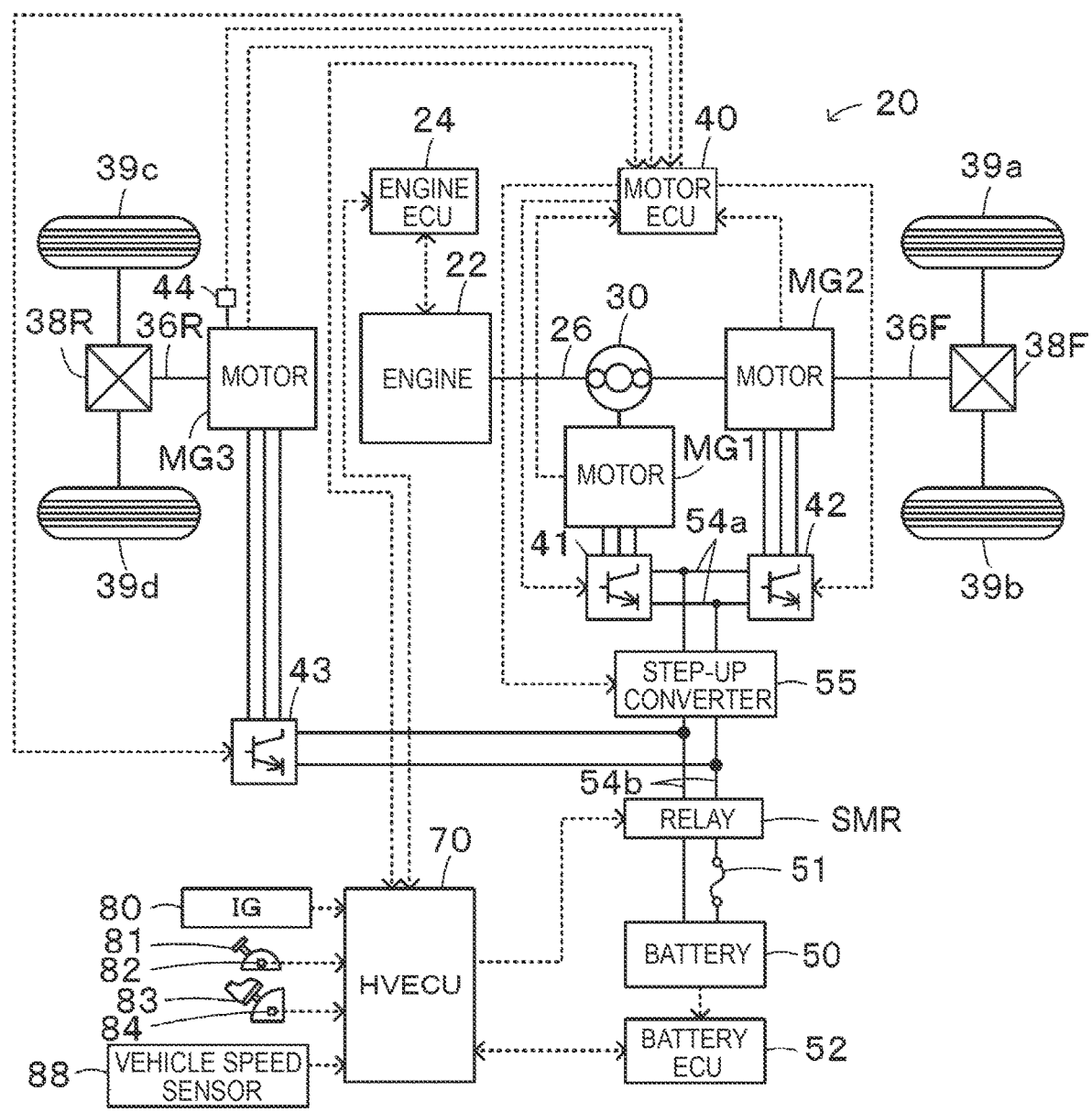
FIG. 1 is a configuration diagram schematically showing a configuration of a hybrid electric vehicle 20 according to an embodiment of the present disclosure.
Figure 2:
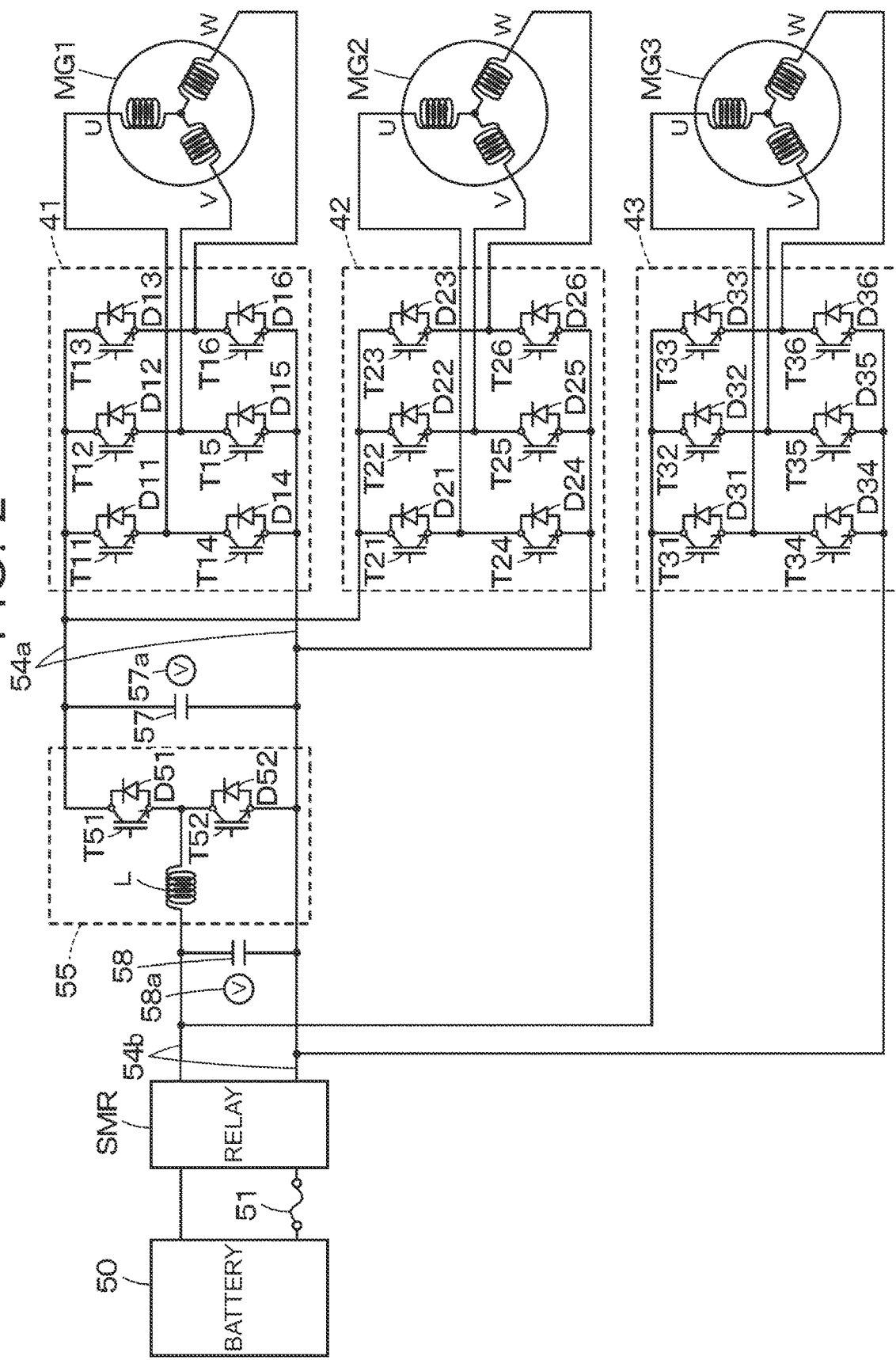
FIG. 2 is a configuration diagram illustrating an outline of a configuration of an electric drive system including motors MG1, MG2, MG3.

FIG. 1 is a configuration diagram schematically showing a configuration of a hybrid electric vehicle 20 according to an embodiment of the present disclosure. FIG. 2 is a configuration diagram illustrating an outline of a configuration of an electric drive system including motors MG1, MG2, MG3. As shown in FIG. 1, hybrid electric vehicle 20 of the embodiment includes an engine 22, a planetary gear 30, motors MG1, MG2, MG3 (first, second, and third motors), inverters (first, second, and third inverters) 41, 42, and 43, a battery (power storage device) 50, a fuse (disconnection device) 51, and a hybrid-use electronic control unit (hereinafter referred to as "HVECU") 70.

The engine 22 is configured as an internal combustion engine that outputs power using gasoline, light oil, or the like as fuel, and is connected to a carrier of the planetary gear 30 via a damper (not shown). The operation of the engine 22 is controlled by an engine electronic control unit (hereinafter referred to as the "engine ECU") 24.

Although not illustrated, the engine ECU 24 is configured as a microprocessor centered on a CPU, and includes a ROM for storing a process program, a RAM for temporarily storing data, an input/output port, and a communication port in addition to CPU. In the engine ECU 24, signals from various sensors required for controlling the operation of the engine 22, for example, a crank angle θcr from a crank position sensor for detecting the rotational position of the crankshaft 26 of the engine 22, and the like are inputted from the input ports. Various control signals for controlling the operation of the engine 22 are output from the engine ECU 24 via output ports. The engine ECU 24 is connected to HVECU 70 via a communication port. The engine ECU 24 calculates the rotational speed Ne of the engine 22 based on the crank angle θcr from the crank position sensor.

The planetary gear 30 is configured as a single pinion type planetary gear mechanism. A rotor of the motor MG1 is connected to the sun gear of the planetary gear 30. A drive shaft 36F connected to front wheels 39a, 39b via a differential gear 38F is connected to a ring gear of the planetary gear 30. As described above, the crankshaft 26 of the engine 22 is connected to the carrier of the planetary gear 30.

Each of the motors MG1, MG2, MG3 is configured as a known synchronous generator motor including a rotor in which permanent magnets are embedded and a stator in which three-phase coils are wound. As shown in FIG. 2, the inverters 41 and 42 are constituted by six transistors T11 to T16, T21 to T26, T31 to T36 and six diode D11 to D16, D21 to D26, D31 to D36 connected in parallel to the transistors T11 to T16, T21 to T26, T31 to T36 in opposite directions. The transistors T11 to T16, T21 to T26 are arranged in pairs of two so as to be source-side and sink-side with respect to the positive and negative buses of the drive-voltage-system power line 54a, respectively. Each of the three-phase coils (U-phase, V-phase, and W-phase) of the motors MG1, MG2 is connected to each of the connecting points of the pair of transistors. Therefore, by adjusting the ratio of the on-time of the paired transistors T11 to T16, T21 to T26 while the inverters 41 and 42 are energized, a rotating magnetic field can be formed in the three-phase coil, and the motors MG1, MG2 can be rotationally driven. Since the inverters 41 and 42 share the positive bus and the negative bus of the drive-voltage-system power line 54a, power generated by any of the motors MG1, MG2 can be supplied to other motors. Transistors T31 to T36 are arranged in pairs of two so as to be the source-side and sink-side with respect to the positive and negative bus of the connection line 54c connected to the battery-voltage-system power line 54b. Each of the three-phase coils (U-phase, V-phase, and W-phase) of the motor MG3 is connected to each of the connecting points of the pair of transistors. Therefore, by adjusting the ratio of the on-time of the paired transistors T31 to T36 while the voltage is applied to the inverter 43, a rotating magnetic field can be formed in the three-phase coil, and the motor MG3 can be rotationally driven. A smoothing capacitor 57 is connected to the positive bus and the negative bus of the drive-voltage-system power line 54a.

As shown in FIG. 2, the step-up converter 55 is configured as a step-up converter including two transistors T51, T52, two diodes D51, D52 connected in parallel to the transistors T51, T52, and a reactor L. The two transistors T51, T52 are connected to the positive bus of the drive-voltage-system power line 54a, the drive-voltage-system power line 54a, and the negative bus of the battery-voltage-system power line 54b, respectively. A reactor L is connected to a connecting point of the transistors T51, T52 and a positive bus line of the battery-voltage-system power line 54b. Therefore, by turning on and off the transistors T51, T52, the power of the battery-voltage-system power line 54b can be boosted and supplied to the drive-voltage-system power line 54a. Further, by turning on and off the transistors T51, T52, the power of the drive-voltage-system power line 54a can be stepped down and supplied to the battery-voltage-system power line 54b. A smoothing capacitor 58 is connected to the positive bus and the negative bus of the battery-voltage-system power line 54b. A system main relay SMR is connected to the battery 50 from the connecting point of the inverter 43 of the battery-voltage-system power line 54b.

Although not shown, the motor ECU 40 is configured as a microprocessor centered on a CPU, and includes, in addition to CPU, a ROM for storing a process program, a RAM for temporarily storing data, input/output ports, and communication ports. In the motor ECU 40, a signal required for driving and controlling the motors MG1, MG2, MG3, for example, a phase current applied to the rotational position θm1, θm2, θm3 from a rotational position detecting sensor (not shown) for detecting the rotational position of the rotor of the motors MG1, MG2, MG3 and motors MG1, MG2, MG3 detected by a current sensor (not shown), a voltage of the capacitor 57 from the voltage sensor 57a attached between the terminals of the capacitor 57 (voltage of the drive-voltage-system power line 54a) VH, a voltage of the capacitor 58 from the voltage sensor 58a attached between the terminals of the capacitor 58 (voltage of the battery-voltage-system power line 54*b*) VL, a motor temperature T3 from the temperature sensor 44 for detecting the temperature of the motor MG3 and the like are inputted via an input port. From the motor ECU 40, a switching control signal to the transistors T11 to T16, T21 to T26, T31 to T36 of the inverters 41, 42, and 43, a switching control signal to the transistors T51, T52 of the step-up converter 55, and the like are output via an output port. The motor ECU 40 is in communication with HVECU 70, and drives and controls the motors MG1, MG2 according to a control signal from HVECU 70, and outputs to HVECU 70 information regarding the operating status of the motors MG1, MG2, MG3 as needed. The motor ECU 40 also calculates the rotational speed Nm1, Nm2, Nm3 of the motors MG1, MG2, MG3 based on the rotational positions θm1, θm2, and θm3 of the rotor of the motors MG1, MG2, MG3 from the rotational position detecting sensor.

The battery 50 is configured as, for example, a lithium-ion secondary battery or a nickel-hydrogen secondary battery. The battery 50 is connected to the inverter 43 and the step-up converter 55 via the battery-voltage-system power line 54*b*. The battery 50 is managed by a battery electronic control unit (hereinafter referred to as "battery ECU") 52.

The fuse 51 is attached to the battery 50 from the connecting point of the inverter 43 on the negative electrode line of the battery-voltage-system power line 54*b*.

Although not shown, the battery ECU 52 is configured as a microprocessor centered on a CPU, and includes a ROM for storing a process program, a RAM for temporarily storing data, an input/output port, and a communication port in addition to CPU. The battery ECU 52 receives signals from various sensors required to manage the battery 50, for example, a voltage Vb of the battery 50 from a voltage sensor mounted between terminals of the battery 50, a current Ib of the battery 50 from a current sensor mounted at an output terminal of the battery 50, and the like via an input port. The battery ECU 52 is connected to HVECU 70 via a communication port. The battery ECU 52 calculates the power storage ratio SOC of the battery 50 based on the integrated value of the current Ib of the battery 50 from the current sensor. The power storage ratio SOC is a ratio of the electric storage amount (electric power amount dischargeable from the battery 50) to the total capacity of the battery 50.

Although not shown, HVECU 70 is configured as a microprocessor centered on CPU. HVECU 70 includes, in addition to CPU, a ROM for storing a process program, a RAM for temporarily storing data, an input/output port, and a communication port. In HVECU 70, a shift position SP from the shift position sensor 82 for detecting an ignition signal from the ignition switch 80 and an operation position of the shift lever 81, an accelerator operation amount Acc from the accelerator pedal position sensor 84 for detecting a depression amount of the accelerator pedal 83, a brake pedal position BP from the brake pedal position sensor 86 for detecting a depression amount of the brake pedal 85, a vehicle speed V from the vehicle speed sensor 88, and the like are inputted via the input port. HVECU 70 outputs a control signal or the like to the system main relay SMR via an output port. As described above, HVECU 70 is connected to the engine ECU 24, the motor ECU 40, and the battery ECU 52 via a communication port. HVECU 70 exchanges various control signals and data with the engine ECU 24, the motor ECU 40, and the battery ECU 52.

In hybrid electric vehicle 20 of the embodiment configured as described above, the vehicle travels by switching between a plurality of driving modes including an electric driving (EV driving) mode in which the vehicle travels without the operation of the engine 22 and a hybrid-driving (HV driving) mode in which the vehicle travels with the operation of the engine 22.

In EV traveling mode, HVECU 70 first sets a required torque Td* required for traveling on the basis of the accelerator operation amount Acc and the vehicle speed V. Subsequently, a value of 0 is set to the torque command Tm1* of the motor MG1, and a torque commands Tm2*, Tm3* of the motors MG2, MG3 are set so that the required torque Td* is outputted to the front wheels 39*a*, 39*b* and the rear wheels 39*c*, 39*d* based on the torque distribution ratio kt. Here, the torque distribution ratio kt is a ratio of the torque output to the front wheels 39*a*, 39*b* with respect to the sum of the torque output to the front wheels 39*a*, 39*b* and the torque output to the rear wheels 39*c*, 39*d*, and is set based on the traveling condition (starting, accelerating, constant speed, decelerating, slipping, and the like). Then, the torque commands Tm1*, Tm2*, Tm3* of the set motors MG1, MG2, MG3 are transmitted to the motor ECU 40. Upon receiving the torque commands Tm1*, Tm2*, Tm3*, the motor ECU 40 performs switching control of the plurality of switching elements of the inverters 41, 42, and 43 so that the motors MG1, MG2, MG3 are driven by the torque commands Tm1*, Tm2*, Tm3*.

In HV traveling mode, HVECU 70 first sets a required torque Td* required for traveling based on the accelerator operation amount Acc and the vehicle speed V, and sets a required power Pd* required for traveling based on the set required torque Td* and the vehicle speed V. Subsequently, the required power Pb* (positive when the battery 50 discharges) of the battery 50 is subtracted from the required power Pd*, and the required power Pe* (required for the engine 22) required by the vehicle is calculated. Then, the target rotational speed Ne*, the target torque Te*, and the torque commands Tm1*, Tm2*, Tm3* of the motors MG1, MG2, MG3 of the engine 22 are set so that the required power Pe* is output from the engine 22 and the required torque Td* is output to the front wheels 39*a*, 39*b* and the rear wheels 39*c*, 39*d* based on the torque distribution ratio kt. Then, the target rotational speed Ne* and the target torque Te* of the engine 22 are transmitted to the engine ECU 24, and the torque commands Tm1*, Tm2*, Tm3* of the motors MG1, MG2, MG3 are transmitted to the motor ECU 40. The engine ECU 24 performs intake air amount control, fuel injection control, ignition control, and the like of the engine 22 so that the engine 22 is operated at the target rotational speed Ne* and the target torque Te*. The control of the inverters 41, 42, and 43 by the motor ECU 40 has been described above.

Next, the operation of hybrid electric vehicle 20 of the embodiment configured in this way, in particular, the operation when an anomaly occurs in which the transistor T52 of the lower arm of the step-up converter 55 is short-circuited during traveling will be described. In the following explanation, the relay SMR is turned on.

Figure 3:
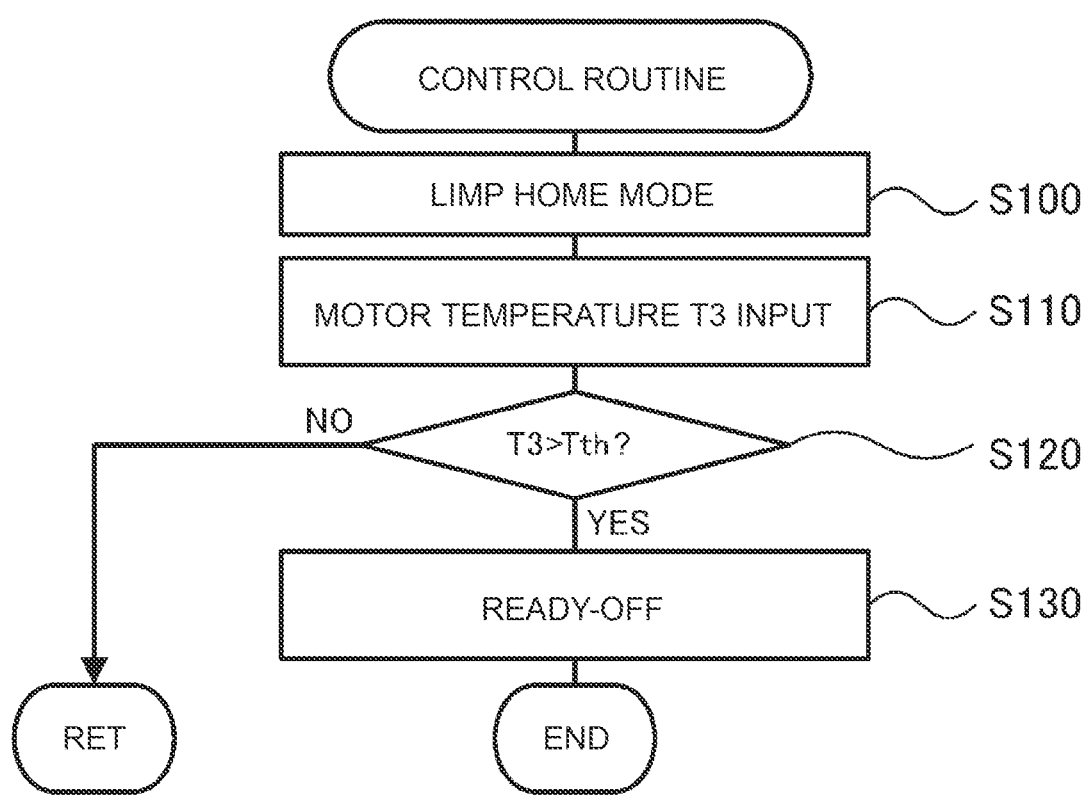
FIG. 3 is a flow chart illustrating an exemplary control routine executed by HVECU 70.

FIG. 3 is a flow chart illustrating an exemplary control routine executed by HVECU 70. This routine is executed when an anomaly occurs in which the transistor T52 of the lower arm of the step-up converter 55 is short-circuited during traveling. It is determined that an abnormality in which the transistor T52 is short-circuited occurs when the voltage (voltage of the battery-voltage-system power line 54*b*) VL of the capacitor 58 from the voltage sensor 58*a* becomes 0.

When this routine is executed, CPU of HVECU 70 controls the transistor T51 of the upper arm of the engine 22, the inverters 41, 42, and 43, and the step-up converter 55 so as to execute the limp home mode (S100). In the limp home mode, HVECU 70's CPU turns off the transistor T51 of the upper arm of the step-up converter 55 and transmits the upper arm off-signal and the three-phase on command of the motor MG3 to the motor ECU 40 so that the motor MG3 turns on in three phases. Then, CPU of HVECU 70 sets the target rotational speed Ne* and the target torque Te* of the engine 22 so that the power Pev for the limp home mode is outputted from the engine 22. CPU of HVECU 70 sets the torque commands Tm1*, Tm2* of the motors MG1, MG2 so that the motor MG2 runs while consuming the electric power generated by the motor MG1 by the power from the engine 22. CPU of HVECU 70 transmits the target rotational speed Ne* and the target torque Te* to the engine ECU 24 and transmits the torque commands Tm1*, Tm2* to the motor ECU 40. Upon receiving the target rotational speed Ne* and the target torque Te*, the engine ECU 24 performs the intake air amount control, the fuel injection control, the ignition control, and the like of the engine 22 so that the engine 22 is operated at the target rotational speed Ne* and the target torque Te*. Upon receiving the upper arm off signal and the three-phase on command of the motor MG3, the motor ECU 40 turns off the transistor T51 of the upper arm of the step-up converter 55, turns on the transistors T31 to T33 of the upper arm of the inverter 43, and turns off the transistors T34 to T36 of the lower arm to turn on the motor MG3 in three phases. The three-phase on of the motor MG3 may be performed by turning off the transistors T31 to T33 of the upper arm of the inverter 43 and turning on the transistors T34 to T36 of the lower arm. Then, the motor ECU 40 that has received the torque commands Tm1*, Tm2* controls the transistors T11 to T16, T21 to T26 of the inverters 41 and 42 so as to drive the motors MG1, MG2 with the torque commands Tm1*, Tm2*. As a result, the limp home mode is executed in which the transistor T51 of the upper arm of the step-up converter 55 is turned off, and the engine 22, the inverters 41, 42, and 43, and the transistor T51 are controlled to run while the electric power generated by the motor MG1 by the power from the engine 22 is consumed by the motor MG2 while the motor MG3 is turned on in three phases.

Figure 4:
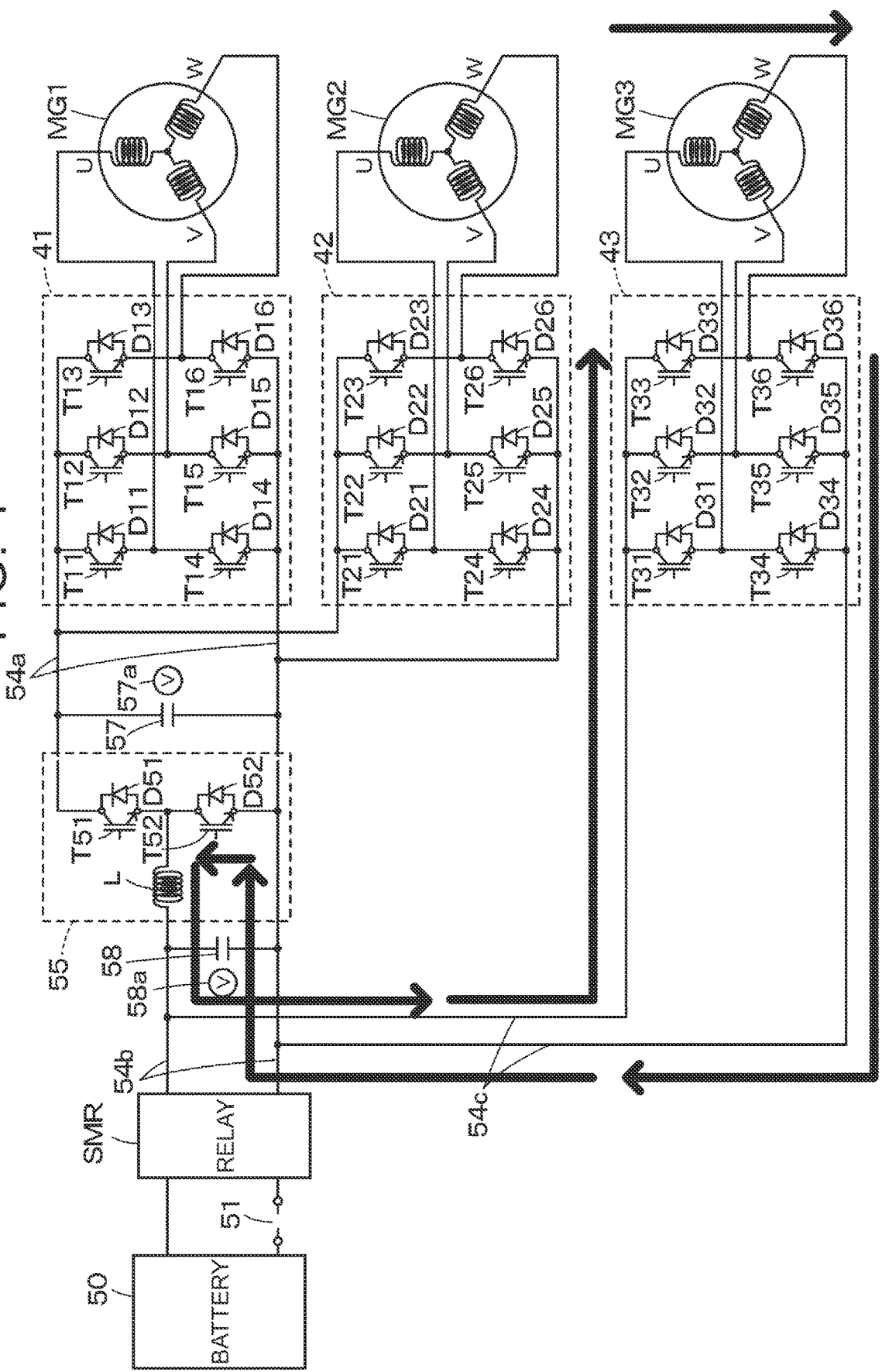
FIG. 4 is an explanatory diagram illustrating an exemplary state of the electric drive system when a limp home mode is not executed when an anomaly occurs in which the transistor T52 of the lower arm of the step-up converter 55 is short-circuited.
Figure 5:
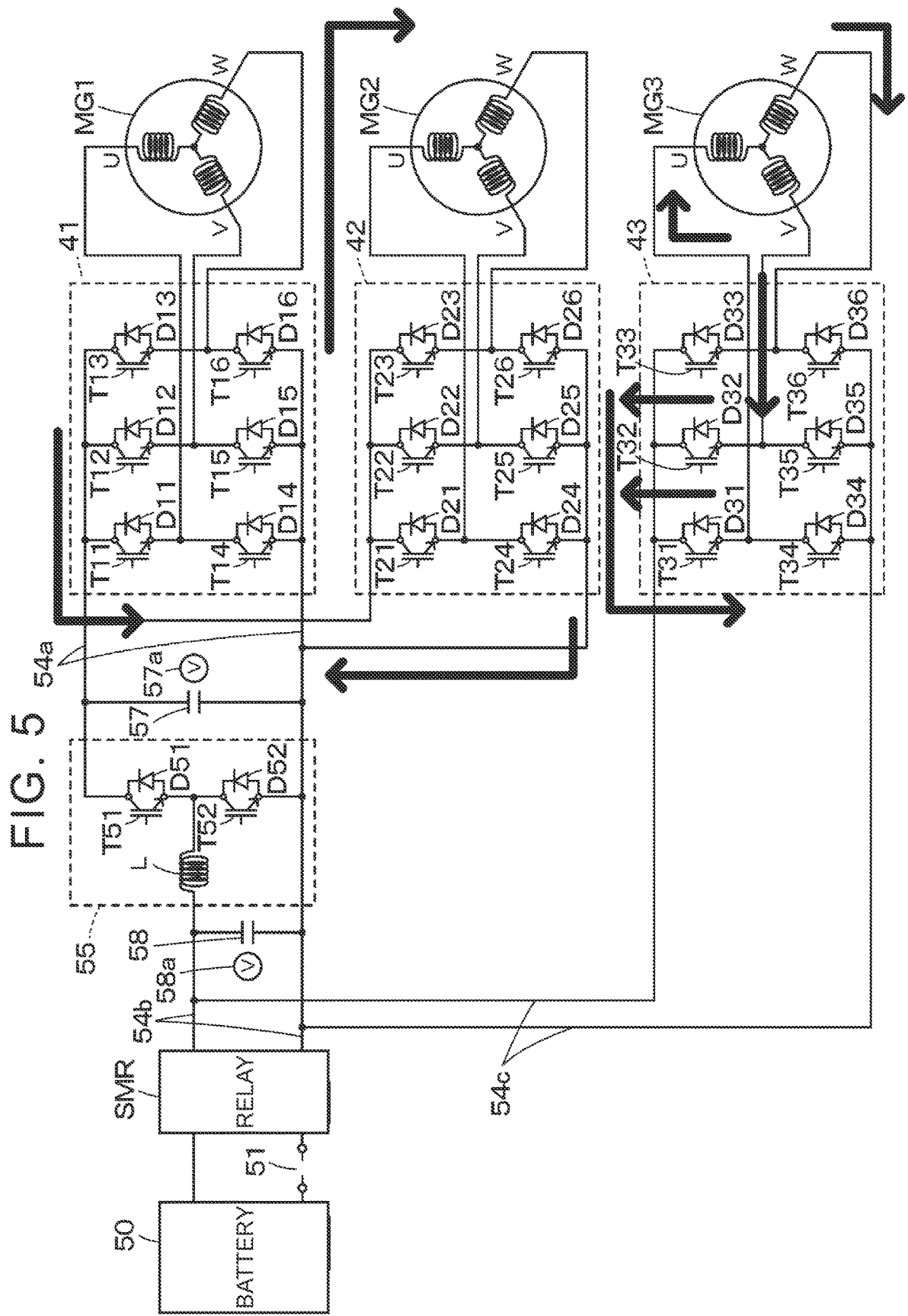
FIG. 5 is an explanatory diagram illustrating an example of a state of the electric drive system when the limp home mode is executed.

Here, the reason for executing the limp home mode will be described. FIG. 4 is an explanatory diagram illustrating an exemplary state of the electric drive system when the limp home mode is not executed when an anomaly occurs in which the transistor T52 of the lower arm of the step-up converter 55 is short-circuited. FIG. 5 is an explanatory diagram illustrating an example of a state of the electric drive system when the limp home mode is executed. In FIG. 4 and FIG. 5, the bold arrows indicate the outline of the direction of the current. When the transistor T52 is short-circuited, the battery-voltage-system power line 54b is short-circuited, a large current flows, the fuse 51 is blown, and the battery 50 is disconnected from the battery-voltage-system power line 54b. When the fuse 51 is blown, a closed circuit is formed by the transistor T52, the reactor L, the inverter 43, and the motor MG3. Since the limp home mode is currently executed, when the back electromotive force is generated by the motor MG3 being carried around, a large current flows through the battery-voltage-system power line 54b and the connection line 54c. In the limp home mode, as shown in FIG. 5, a closed circuit is formed by the motor MG1, the inverters 41 and 42, and the motor MG2, and a closed circuit is formed by the motor MG3 and the inverter 43. Therefore, it is possible to prevent a current from flowing through the battery-voltage-system power line 54b and the connection line 54c. That is, the limp home mode is executed to cause hybrid electric vehicle 20 to travel while suppressing a large current from flowing through the battery-voltage-system power line 54b and the connection line 54c.

Subsequently, the motor temperature T3 is inputted (S110), and it is determined whether or not the motor temperature T3 exceeds the allowable temperature Tth (S120). In S110, the motor temperature T3 is inputted via a motor ECU 40 with a value detected by a temperature sensor 44 that detects the temperature of the motor MG3. The allowable temperature Tth is a value determined in advance by experimentation, analysis, or machine-learning as a temperature that is slightly lower than the upper limit value of the temperature allowable for the motor MG3 or the upper limit value of the temperature allowable for the motor MG3. When the limp home mode is executed, a closed circuit is formed by the motor MG3 and the inverter 43. When the motor MG3 is rotated together to generate a back electromotive force, a large current flows through the motor MG3, and the motor MG3 may reach a high temperature. S110, S120 is a process for determining whether or not the motor MG3 is high in the limp home mode.

When the motor temperature T3 is equal to or lower than the allowable temperature Tth in S120, it is determined that the limp home mode may be continued, and this routine is ended. When the motor temperature T3 is equal to or lower than the allowable temperature Tth in S120, it is determined that the inverter 43 is at a high temperature due to running in S100 process, and the inverter is ready-off (system-stopped) (S130), and this routine is ended. By performing the ready-off in this manner, the limp home mode is stopped. Therefore, generation of the back electromotive force due to rotation of the motor MG3 is avoided, and it is possible to suppress the inverter 43 from becoming a high temperature.

According to hybrid electric vehicle 20 of the embodiment described above, when an abnormality occurs in which the transistor T52 of the lower arm of the step-up converter 55 is short-circuited, the engine 22, the inverters 41, 42, 43, and the transistor T51 are controlled to run while the electric power generated by the motor MG1 by the power from the engine 22 is consumed by the motor MG2 while the motor MG3 is turned on in three phases, and when the motor temperature T3 exceeds the allowable temperature Tth in the limp home mode, the motor MG3 can be suppressed from becoming high by stopping the limp home mode.

In hybrid electric vehicle 20 of the embodiment, the fuse 51 is used as the disconnection device. However, a relay SMR may be used. When the transistor T52 of the lower arm of the step-up converter 55 is short-circuited, the relay SMR may be turned off.

In hybrid electric vehicle 20 of the embodiment, the battery 50 is used as the power storage device. However, a capacitor may be used.

In hybrid electric vehicle 20 of the embodiment, the engine 22, the planetary gear 30, the motor MG1, and the motor MG2 are connected to the drive shaft 36F connected to the front wheels 39a, 39b, and the motor MG3 is connected to the drive shaft 36R connected to the rear wheels 39c, 39d, but the motor MG1 and the motor MG2 may be connected to the drive shaft 36R connected to the rear wheels 39c, 39d and the motor MG3 may be connected to the drive shaft 36F connected to the front wheels 39a, 39b.

Although the modes for carrying out the disclosure have been described above with the embodiment, the disclosure is not limited to the embodiment, and may be embodied in various modes without departing from the scope of the disclosure.

The present disclosure is applicable to a hybrid electric vehicle manufacturing industry and the like.

What is claimed is:

1. A hybrid electric vehicle comprising:
   an engine;
   a first motor;
   a planetary gear in which three respective rotating elements are connected to the first motor, the engine, and a drive shaft connected to one of a front wheel and a rear wheel;
   a second motor connected to the drive shaft;
   a first inverter and a second inverter that drive the first motor and the second motor;
   a power storage device;
   a step-up converter that includes two switching elements of an upper arm and a lower arm, and a reactor, boosts power from the power storage device, and supplies the boosted power to the first inverter and the second inverter;
   a third motor connected to another one of the front wheel and the rear wheel;
   a third inverter that is connected to a power line between the power storage device and the step-up converter via a connection line and drives the third motor;
   a disconnection device that allows the power storage device to be connected to and disconnected from the step-up converter and the third inverter; and
   a control device that controls the engine, the first inverter, the second inverter, the third inverter, and the two switching elements of the step-up converter, wherein the control device
   controls the engine, the first inverter, the second inverter, the third inverter, and a switching element of the upper arm of the step-up converter such that a limp home mode is executed when an abnormality in which a switching element of the lower arm of the step-up converter is short-circuited occurs and the disconnection device disconnects the power storage device from the step-up converter and the third inverter, the limp home mode being a mode in which the vehicle travels while the second motor consumes electric power generated by the first motor using power from the engine in a state in which the switching element of the upper arm of the step-up converter is turned off and three phases in the third inverter are turned on, and
   stops the limp home mode when a temperature of the third motor exceeds an allowable temperature in a case in which the limp home mode is executed.

2. The hybrid electric vehicle according to claim 1, wherein the disconnection device is a fuse attached to a side of the power line closer to the power storage device than a connection point of the connection line.

* * * * *